(12) United States Patent
Gokhale et al.

(10) Patent No.: US 8,713,360 B2
(45) Date of Patent: Apr. 29, 2014

(54) REGISTRY KEY FEDERATION SYSTEMS AND METHODS

(71) Applicant: CommVault Systems, Inc., Oceanport, NJ (US)

(72) Inventors: Parag Gokhale, Marlboro, NJ (US); Amey Vijaykumar Karandikar, Long Branch, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 0 days.

(21) Appl. No.: 13/931,233

(22) Filed: Jun. 28, 2013

(65) Prior Publication Data

US 2013/0290948 A1    Oct. 31, 2013

Related U.S. Application Data

(63) Continuation of application No. 12/895,587, filed on Sep. 30, 2010, now Pat. No. 8,495,420.

(60) Provisional application No. 61/364,971, filed on Jul. 16, 2010.

(51) Int. Cl.
 *G06F 11/00*    (2006.01)

(52) U.S. Cl.
 USPC ......................................................... 714/6.3

(58) Field of Classification Search
 USPC ......................................................... 714/6.3
 See application file for complete search history.

(56) References Cited

U.S. PATENT DOCUMENTS

| | | | |
|---|---|---|---|
| 4,084,231 A | 4/1978 | Capozzi et al. | |
| 4,267,568 A | 5/1981 | Dechant et al. | |
| 4,283,787 A | 8/1981 | Chambers | |
| 4,417,321 A | 11/1983 | Chang et al. | |
| 4,641,274 A | 2/1987 | Swank | |

(Continued)

FOREIGN PATENT DOCUMENTS

| | | |
|---|---|---|
| AU | 2004227949 | 10/2004 |
| CA | 2498174 | 3/2004 |

(Continued)

OTHER PUBLICATIONS

Arneson, "Mass Storage Archiving in Network Environments" IEEE, 1998, pp. 45-50.

(Continued)

*Primary Examiner* — Bryce Bonzo
(74) *Attorney, Agent, or Firm* — Knobbe Martens Olson & Bear LLP

(57) ABSTRACT

According to certain aspects, a method is disclosed for registry key management in a network. The method includes detecting registry keys stored in a registry of a plurality of client computing devices and storing on a remote database a copy of the registry keys. The remote database is in communication with each of the client computing devices. The method further includes tracking with a management module running on the client computing devices modifications made to the registry of the first client device. In addition, the method includes modifying the copy of the registry keys on the remote database to reflect the modifications to the registry of the first client computing device; detecting a rebuild operation of the first client computing device; and automatically reinstalling registry keys on the first client computing device based on the copy of the registry keys stored on the remote database.

20 Claims, 3 Drawing Sheets

(56) References Cited

U.S. PATENT DOCUMENTS

| | | |
|---|---|---|
| 4,654,819 A | 3/1987 | Stiffler et al. |
| 4,686,620 A | 8/1987 | Ng |
| 4,912,637 A | 3/1990 | Sheedy et al. |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,301,286 A | 4/1994 | Rajani |
| 5,321,816 A | 6/1994 | Rogan et al. |
| 5,347,653 A | 9/1994 | Flynn et al. |
| 5,410,700 A | 4/1995 | Fecteau et al. |
| 5,420,996 A | 5/1995 | Aoyagi |
| 5,454,099 A | 9/1995 | Myers et al. |
| 5,559,991 A | 9/1996 | Kanfi |
| 5,642,496 A | 6/1997 | Kanfi |
| 6,418,478 B1 | 7/2002 | Ignatius et al. |
| 6,542,972 B2 | 4/2003 | Ignatius et al. |
| 6,560,719 B1 | 5/2003 | Pham et al. |
| 6,636,961 B1 | 10/2003 | Braun et al. |
| 6,658,436 B2 | 12/2003 | Oshinsky et al. |
| 6,721,767 B2 | 4/2004 | De Meno et al. |
| 6,760,723 B2 | 7/2004 | Oshinsky et al. |
| 6,820,136 B1 | 11/2004 | Pham et al. |
| 7,003,641 B2 | 2/2006 | Prahlad et al. |
| 7,035,880 B1 | 4/2006 | Crescenti et al. |
| 7,130,970 B2 | 10/2006 | Devassy et al. |
| 7,162,496 B2 | 1/2007 | Amarendran et al. |
| 7,174,433 B2 | 2/2007 | Kottomtharayil et al. |
| 7,209,972 B1 | 4/2007 | Ignatius et al. |
| 7,246,207 B2 | 7/2007 | Kottomtharayil et al. |
| 7,315,923 B2 | 1/2008 | Retnamma et al. |
| 7,315,924 B2 | 1/2008 | Prahlad et al. |
| 7,380,072 B2 | 5/2008 | Kottomtharayil et al. |
| 7,389,311 B1 | 6/2008 | Crescenti et al. |
| 7,395,282 B1 | 7/2008 | Crescenti et al. |
| 7,401,154 B2 | 7/2008 | Ignatius et al. |
| 7,409,509 B2 | 8/2008 | Devassy et al. |
| 7,440,982 B2 | 10/2008 | Lu et al. |
| 7,447,692 B2 | 11/2008 | Oshinsky et al. |
| 7,454,569 B2 | 11/2008 | Kavuri et al. |
| 7,484,054 B2 | 1/2009 | Kottomtharayil et al. |
| 7,490,207 B2 | 2/2009 | Amarendran |
| 7,500,053 B1 | 3/2009 | Kavuri et al. |
| 7,536,291 B1 | 5/2009 | Retnamma et al. |
| 7,543,125 B2 | 6/2009 | Gokhale |
| 7,546,324 B2 | 6/2009 | Prahlad et al. |
| 7,581,077 B2 | 8/2009 | Ignatius et al. |
| 7,603,386 B2 | 10/2009 | Amarendran et al. |
| 7,606,844 B2 | 10/2009 | Kottomtharayil |
| 7,613,748 B2 | 11/2009 | Brockway et al. |
| 7,613,752 B2 | 11/2009 | Prahlad et al. |
| 7,617,253 B2 | 11/2009 | Prahlad et al. |
| 7,617,262 B2 | 11/2009 | Prahlad et al. |
| 7,620,710 B2 | 11/2009 | Kottomtharayil et al. |
| 7,636,743 B2 | 12/2009 | Erofeev |
| 7,651,593 B2 | 1/2010 | Prahlad et al. |
| 7,657,550 B2 | 2/2010 | Prahlad et al. |
| 7,660,807 B2 | 2/2010 | Prahlad et al. |
| 7,661,028 B2 | 2/2010 | Erofeev |
| 7,739,459 B2 | 6/2010 | Kottomtharayil et al. |
| 7,747,579 B2 | 6/2010 | Prahlad et al. |
| 7,757,043 B2 | 7/2010 | Kavuri et al. |
| 7,769,961 B2 | 8/2010 | Kottomtharayil et al. |
| 7,801,864 B2 | 9/2010 | Prahlad et al. |
| 7,802,067 B2 | 9/2010 | Prahlad et al. |
| 7,809,914 B2 | 10/2010 | Kottomtharayil et al. |
| 8,032,491 B1 * | 10/2011 | Appellof et al. ............... 707/649 |
| 8,495,420 B2 * | 7/2013 | Gokhale et al. ................. 714/15 |
| 2013/0047084 A1 * | 2/2013 | Sanders et al. ................. 715/716 |

FOREIGN PATENT DOCUMENTS

| | | |
|---|---|---|
| DE | 69415115 | 8/1999 |
| DE | 60020978 | 4/2006 |
| EP | 0259912 | 3/1988 |
| EP | 0405926 | 1/1991 |
| EP | 0467546 | 1/1992 |
| EP | 0645709 | 3/1995 |
| EP | 0774715 | 5/1997 |
| EP | 0809184 | 11/1997 |
| EP | 541281 | 4/1998 |
| EP | 0899662 | 3/1999 |
| EP | 0981090 | 2/2000 |
| EP | 1393181 | 1/2001 |
| EP | 1204922 | 5/2002 |
| EP | 1384135 | 7/2010 |
| GB | 2409553 | 6/2005 |
| GB | 2410106 | 7/2005 |
| GB | 2425199 | 10/2006 |
| GB | 2435756 | 9/2007 |
| GB | 2447361 | 9/2008 |
| IN | 226655 | 6/2007 |
| IN | 234083 | 6/2007 |
| IN | 234518 | 7/2009 |
| JP | 4267443 | 9/2004 |
| JP | 4198050 | 10/2004 |
| MX | 254554 | 2/2008 |
| WO | WO 95/13580 | 5/1995 |
| WO | WO 99/12098 | 3/1999 |

OTHER PUBLICATIONS

Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

EITEL, "Backup and Storage Management in Distributed Heterogeneous Environments," IEEE, 1994, pp. 124-126.

IBM Technical Disclosure Bulletin, vol. 24, No. 5, Oct. 1981 New York, US, pp. 2404-2406, K.L. Huff, "Data Set Usage Sequence Number".

Rosenblum et al., "The Design and Implementation of a Log-Structure File System," Operating Systems Review SIGOPS, vol. 25, No. 5, New York, US, pp. 1-15 (May 1991).

* cited by examiner

REGISTRY KEY FEDERATION SYSTEMS AND METHODS

CROSS-REFERENCE TO RELATED APPLICATION

This application is a continuation of U.S. patent application Ser. No. 12/895,587, filed on Sep. 30, 2010, entitled "REGISTRY KEY FEDERATION SYSTEMS AND METHODS," which claims the benefit of U.S. Provisional Patent Application No. 61/364,971, filed on Jul. 16, 2010, entitled "REGISTRY KEY FEDERATION SYSTEMS AND METHODS," the disclosures of which are hereby incorporated by reference in their entireties.

BACKGROUND

1. Field

The present disclosure relates to maintaining configuration settings for a computer system and, in particular, to systems and methods for managing registry keys in a network environment.

2. Description of the Related Art

Certain operating systems, such as MICROSOFT WINDOWS, utilize a database that holds configuration settings used by the operating system. For instance, the database can include data files used to store the configuration settings and/or user profiles the operating system accesses to control hardware and software components installed on the computer. Loss of the registry can be catastrophic since few applications can function properly on the system hard disk without the user engaging in the time-consuming process of reinstalling the applications.

For example, the WINDOWS operating system includes a registry that is organized into a tree-like folder structure. The highest-level logical section is often referred to as a "hive," which further includes "keys" and "sub-keys." Within these lower-level logical sections are stored actual data or information, referred to as "values," which include specific settings used internally by the operating system.

Registry keys can oftentimes be very lengthy, making manual entry difficult. Complicating the matter even further, when a client system crashes and must be rebuilt, a user is oftentimes required to remember which registry keys were installed prior to the crash and to manually reinstall such keys to the client system. As can be appreciated, not only can the rebuilding process be difficult and time intensive, a user may not be familiar with and/or know how to access all the registry keys that were previously present on the client system.

SUMMARY

In view of the foregoing, a need exists for improved systems and methods for managing registry keys in a computing environment. For example, there is a need for improved systems for storing at a centralized, remote location copies of registry keys and/or for facilitating reinstallation of registry keys during the rebuilding of a client system.

Certain embodiments of the invention are provided for registry key management. For instance, certain systems include a centralized database that tracks which registry keys are installed on a plurality of client systems in a network environment. In certain embodiments, registry key changes made on a client system are entered through a management user interface, which further records the registry key changes on the centralized database. In yet further embodiments, one or more application programming interfaces (APIs) can be used to discover which registry keys have already been installed on each of the client systems.

In this manner, when one or more client systems is required to be rebuilt, the centralized database can provide an indication as to which registry keys, and their specific values, should be reinstalled on the client system(s). Moreover, such reinstallation can be performed even though the rebuilt client machine may include a new operating system. In addition, the centralized database allows for further processing of the registry keys, such as by replicating registry keys to different machines and/or applying registry key policies over groups of machines in the network.

In certain embodiments, a method is disclosed for registry key management in a computer network. The method includes detecting registry keys stored in a registry of each of a plurality of client computing devices and storing on a remote database a copy of the registry keys, the remote database being in network communication with each of the plurality of client computing devices. The method further includes tracking with a management module executing on a first one of the plurality of client computing devices modifications made to the registry of the first client computing device. In addition, the method includes modifying the copy of the registry keys on the remote database to reflect said modifications to the registry of the first client computing device; detecting a rebuild operation of the first client computing device; and automatically reinstalling registry keys on the first client computing device based on the copy of the registry keys stored on the remote database.

In certain embodiments, a system is disclosed for managing registry keys in a computer network. The system comprises a plurality of client computing devices each comprising a registry having a plurality of registry keys and at least one management server in network communication with the plurality of client computing devices, the at least one management server maintaining in a database an indication of the plurality of registry keys installed in each registry of the plurality of client computing devices. The method also includes a management module executing on a first one of the plurality of client computing devices, wherein the management module is configured to: automatically track modifications made to the registry of the first client computing device; and instruct the at least one management server to update the indication of the plurality of registry keys to reflect said modifications.

In certain embodiments, a system is disclosed for managing registry keys in a computer network. The system comprises means for detecting registry keys stored in a registry of each of a plurality of client computing devices and means for storing a copy of the registry keys, said storing means being in network communication with each of the plurality of client computing devices. The system further includes means for tracking on a first one of the plurality of client computing devices modifications made to the registry of the first client computing device and means for modifying the copy of the registry keys on said storing means to reflect said modifications to the registry of the first client computing device. In addition, the system includes means for automatically reinstalling registry keys on the first client computing device based on the copy of the registry keys stored on said storing means.

For purposes of summarizing the disclosure, certain aspects, advantages and novel features of the inventions have been described herein. It is to be understood that not necessarily all such advantages may be achieved in accordance with any particular embodiment of the invention. Thus, the inventions may be embodied or carried out in a manner that achieves or optimizes one advantage or group of advantages as taught herein without necessarily achieving other advantages as may be taught or suggested herein.

DETAILED DESCRIPTION OF THE PREFERRED EMBODIMENTS

As will be seen from the disclosure herein, certain systems and methods are provided for managing registry keys in a computing environment. For instance, certain embodiments of the invention include improved systems for storing copies of registry keys and/or for facilitating reinstallation of registry keys during the rebuilding of a client system.

Certain inventive systems include a centralized, management database that tracks which registry keys are installed on a plurality of client systems in a network environment. In certain embodiments, changes made to any, or a select, registry key can performed through a management user interface, which further records the changes on the management database. In yet further embodiments, one or more APIs, scripts or other application processes can be used to discover which registry keys have already been stored on each of the client devices, and replicate the keys, or identification of such keys, to the management database.

In certain embodiments, when one or more client systems is required to be rebuilt, the management database can provide an indication as to which registry keys, and their specific values, should be reinstalled on the client system(s). Moreover, such reinstallation can be performed even though the rebuilt client machine may include a new operating system. In addition, the management database allows for replication of registry keys to different machines and/or application of registry key policies over groups of machines.

The features of the systems and methods will now be described with reference to the drawings summarized above. Throughout the drawings, reference numbers are re-used to indicate correspondence between referenced elements. The drawings, associated descriptions, and specific implementation are provided to illustrate embodiments of the invention and not to limit the scope of the disclosure.

Figure 1:
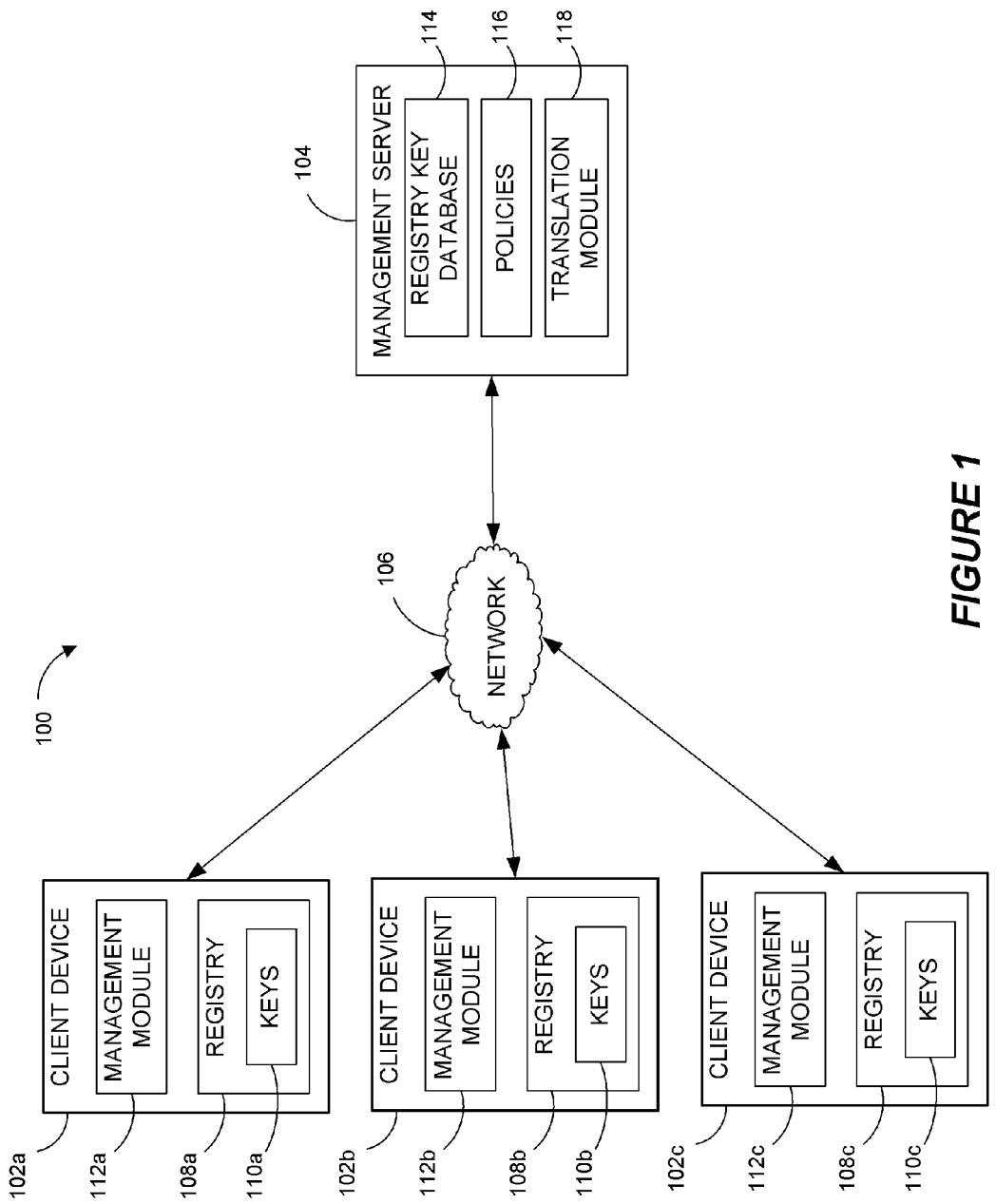
FIG. 1 illustrates a block diagram of a system for managing registry keys according to certain embodiments of the invention.

FIG. 1 illustrates a block diagram of a system 100 for managing registry keys according to certain embodiments of the invention. In certain embodiments, the system 100 facilitates the rebuilding of one or more client devices by maintaining a database of installed registry keys and/or indications of the registry keys on the client devices.

As shown, the management system 100 comprises a plurality of client devices 102a, 102b and 102c (individually and collectively "102") that communicate with a management server 104 via a network 106. Each of the client devices 102 comprises a computing device configured to manipulate, generate or otherwise process data. In certain embodiments, the client device 102 comprises a desktop computer. In other embodiments, the client device 102 can comprise a server, a workstation, a virtual machine, a laptop, a notebook, a personal computer, a smartphone, a PDA, combinations of the same or the like.

In particular, the client devices 102 comprise one or more software applications executing thereon to interact with a user to process data and may include, for example, database applications (e.g., SQL applications), word processors, spreadsheets, financial applications, management applications, e-commerce applications, browsers, combinations of the same or the like. For example, in certain embodiments, the applications may comprise one or more of the following: MICROSOFT EXCHANGE, MICROSOFT SHAREPOINT, MICROSOFT SQL SERVER, ORACLE, MICROSOFT WORD and LOTUS NOTES.

As shown, client device 102a further comprises a registry 108a with a plurality of registry keys 110a, client device 102b further comprises a registry 108b with a plurality of registry keys 110b, and client device 102c further comprises a registry 108c with a plurality of registry keys 110c. In certain embodiments of the invention, each of the client devices 102 comprises a MICROSOFT WINDOWS operating system, and the registry keys 110 enable the operating system to control hardware and software components installed on the client device 102. In yet other embodiments, the client devices 102 may be associated with one or more other types of operating systems (e.g., UNIX), virtual machines, or the like.

In addition, each of the client devices 102a, 102b and 102c comprises, respectively, management modules 112a, 112b and 112c (individually and collectively "112"). In certain embodiments, each management module 112 is configured or programmed to track, record and/or ingest registry keys and/or changes to registry keys on a specific client device 102 and to transmit information regarding the keys to the management server 104.

In certain embodiments, the management module 112 comprises and/or interacts with an interface through which the user enters changes to the registry 108. For instance, the user interface may be part of a standard registry editor provided with an operating system. In yet other embodiments, the user interface can comprise a customized interface, such as a graphical user interface or window, through which the user requests the changes. Moreover, the management module 112 can comprise and/or communicate with one or more APIs that are configured to access the registry 108 and identify and/or ingest registry keys 110 stored therein.

The management server 104 comprises one or more destination devices for storing configuration data relating to the client devices 102. For instance, in certain embodiments, the management server 104 comprises and/or communicates with a plurality of storage devices in network communication with each other and coupled to the network 106. In such embodiments, the management server 104 can comprise one or more storage manager devices and/or storage controller devices that direct the storage and retrieval of backup data, such as described in U.S. Pat. No. 7,389,311, issued Jun. 17, 2008, which is hereby incorporated herein by reference in its entirety to be considered part of this specification.

In particular, the management server 104 includes a registry key database 114, policies 116 and a translation module 118 that are usable to manage registry keys on the plurality of client devices 102. In certain embodiments, the registry key database 114 maintains a copy of the registry keys 110 on the client devices 102. For instance, the database 114 can communicate with the management module 112 to acquire a copy of each registry key 110 on each client device 112. In one example, the database 114 stores only a single copy of a particular registry key 110 for multiple devices 102 in order to reduce duplicate storage of keys. In yet other embodiments, the database 114 does not include copies of registry keys 110 other than those keys that satisfy a predetermined criteria or policy.

In yet other embodiments, the database 114 does not store a copy of the entire registry key 110, but retains sufficient information to reinstall registry keys 110 to a particular client device 102 following a failure of the client device 102. For instance, the database 114 can comprise an indication such as a table, list or other data structure of values and other information usable to replicate or reinstall the registry keys when needed.

The management server 104 further comprises policies 116 for managing the registry keys 110 in the system 100. For instance, the policies 116 may indicate to the management module 112 which types of registry keys 110 should have copies maintained in the database 114. In yet other embodiments, the policies 116 can be applied to the stored registry keys in the database 114. For instance, the policy 116 may dictate which registry keys 110 should be replicated to a specific group of client devices 102 and/or users.

In certain circumstances, a client device 102 may undergo an operating system upgrade or change. In such situations, particular registry keys 110 used for a first operating system may not function within a second operating system. Thus, reinstalling registry keys 110 identified in the registry key database 114 to a client device 102 with a new operating system may trigger system errors or incompatibility issues. To assist with a transition between two operating systems, the translation module 118 of the management server 104 is configured to translate a registry key 110 compatible and/or associated with a format of a first operating system to a modified key compatible with a format of a second operating system.

It will also be understood that the management server 104 can store other information not specifically illustrated in FIG. 1. For instance, the management server 104 may back up or control the backup of other data, such as, for example, configuration information, files, folders, or the like associated with the client devices 102.

The illustrated network 106 advantageously comprises any means for communicating data between two or more systems or components. It certain embodiments, the network 106 comprises a computer network. For example, the network 106 may comprise a public network such as the Internet, virtual private network (VPN), token ring or TCP/IP based network, wide area network (WAN), local area network (LAN), an intranet network, point-to-point link, a wireless network, cellular network, wireless data transmission system, two-way cable system, interactive kiosk network, satellite network, broadband network, baseband network, combinations of the same or the like.

Figure 2:
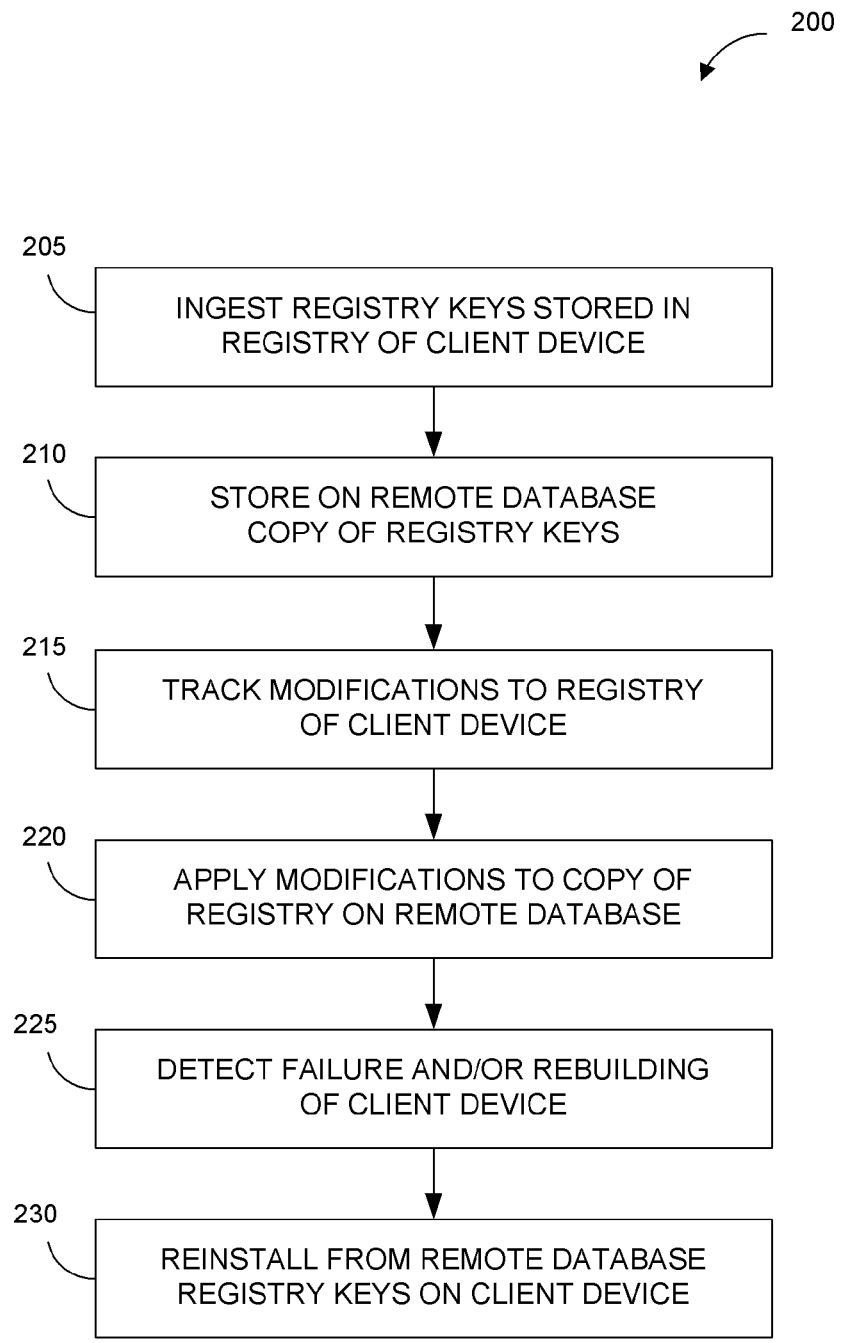
FIG. 2 illustrates a flow chart of an exemplary embodiment of a registry key management process usable by the system of FIG. 1.

FIG. 2 illustrates a flow chart of an exemplary embodiment of a registry key management process 200. In general, the process 200 advantageously facilitates the reinstallation of registry keys during the rebuilding of a client system, such as following a system failure, operating system upgrade or the like. For exemplary purposes, the process 200 will be described herein with reference to the components of the management system 100 of FIG. 1.

The process 200 begins at Block 205 wherein the management module 112 detects the registry keys 110 installed on the client device 102. As discussed above, in certain embodiments, such detection is performed using one or more APIs. In yet other embodiments, a snapshot or other copy can be generated of the registry 108 to identify the registry keys 110 stored thereon.

At Block 210, a copy of the registry keys 110 is stored on the database 114 of the management server 104. In certain embodiments, a copy of the entire registry 108 is maintained in the database 114. In yet other embodiments, only a select portion of the registry keys 110 is stored in the database 114, such as based on one or more of the policies 116 and/or user preferences.

The process 200 continues to monitor the registry 108 and/or client device 102 to track modifications made to the registry keys 110 (Block 215). For instance, the process 200 can include utilizing a user interface and/or software routine to capture user- and/or system-initiated modifications to the registry keys 110. At Block 220, the process 200 applies the tracked modifications to the corresponding copies of the registry keys 110 in the database 114. In this manner, the database 114 maintains an up-to-date and synchronized record of the registry keys 110 and accompanying values stored on the client device 102.

At Block 225, the process 200 detects a failure or other event associated with the client device 102 that requires rebuilding of the client device 102, along with a reinstallation of at least a portion of the registry keys 110. For instance, the management server 104 may receive a request to reinstall registry keys to the client device 102. At Block 230, the process completes by reinstalling from the remote database 114 the registry keys to the client device 102. For instance, such reinstallation can be a copying of the registry keys stored in the database 114 when the database maintains full copies of the keys, or the reinstallation can include accessing one or more remote locations having copies of the registry keys 110 based on information stored in the database 114.

As can be seen, the process 200 advantageously provides for an expedited rebuilding of the failed client device 102 and reduces the chance of human error when compared to manual reinstallation of registry keys that were previously installed on the client device 102. Moreover, with embodiments of the invention, the user does not need to remember which registry keys 110 were previously installed on the client device 102.

Although the process 200 has been described with reference to specific examples, other embodiments of the invention can vary from that which is illustrated in FIG. 2. For instance, with respect to Block 210, the process 200 may not store copies of the registry keys 110 in the database 114 of the management server 104. Rather, the database 114 can maintain an indication of, or other information regarding, which registry keys are stored on the various client devices 102. Such information, such as identifiers, links or the like, can then be used to obtain copies of the registry keys 110 from another location when needed for reinstallation.

Figure 3:
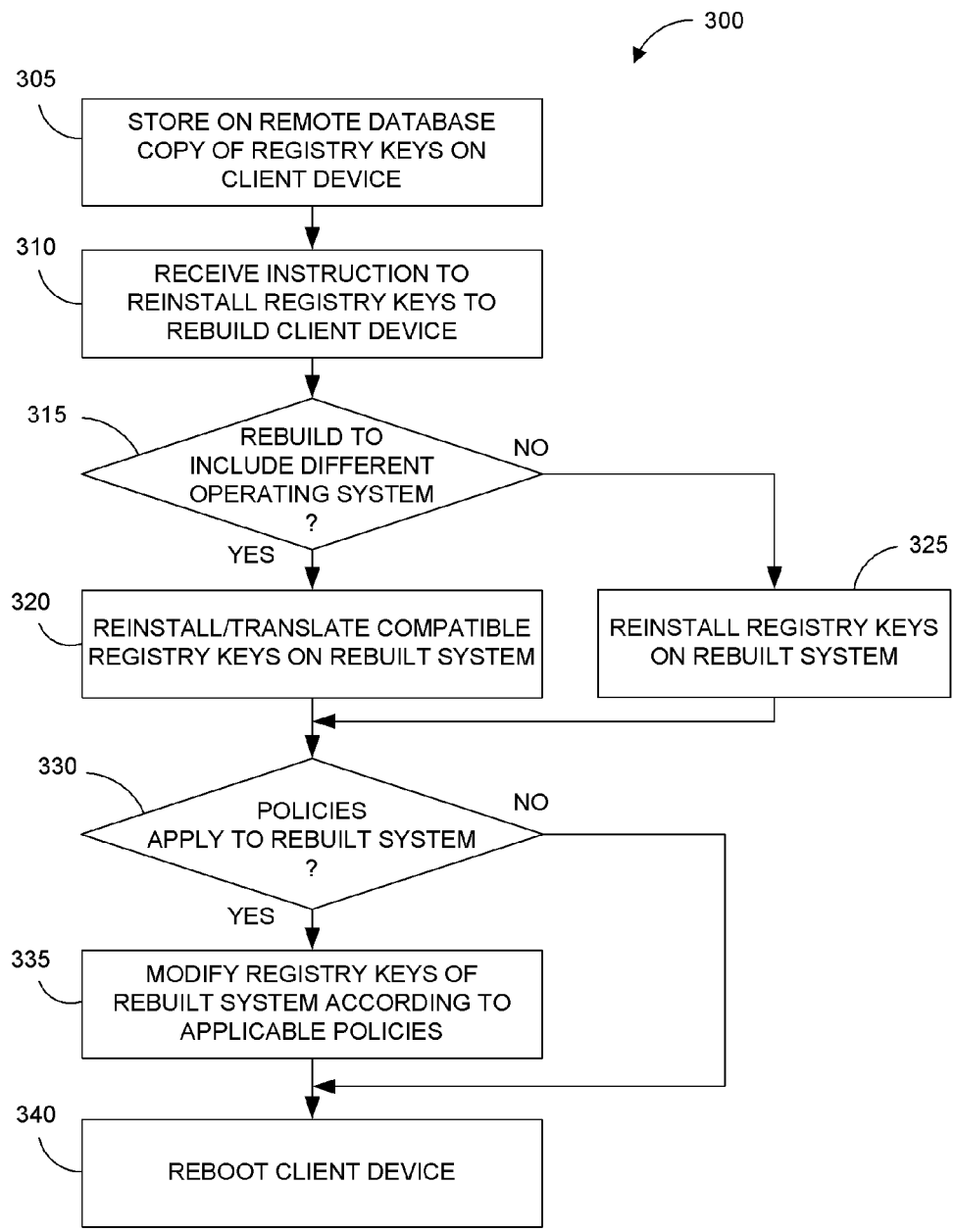
FIG. 3 illustrates a flow chart of an exemplary embodiment of another registry key management process usable by the system of FIG. 1.

FIG. 3 illustrates a flow chart of another embodiment of a management process 300 usable by the system 100 of FIG. 1. Like the process 200, the management process 300 facilitates the reinstallation of registry keys when rebuilding a client device 102. For exemplary purposes, the management process 300 will be described herein with reference to the components of the system 100 of FIG. 1. Moreover, steps or acts of the management process 300 that have been described previously with respect to the process 200 of FIG. 2 will not necessarily be re-described in detail.

The process 300 begins at Block 305 by storing a copy of the registry keys 110 of a client device 102 on the database 114 of the management server 104, as discussed in more detail above. At Block 310, the management server 104 is informed that the client device 102 is to be rebuilt. For instance, in certain embodiments, the management module 112 of the client device 102 instructs the management server 104 that registry keys 110 stored in the database 114 are to be reinstalled on the client device 102.

At Block 315, the process 300 determines if rebuilding the client device 102 includes installing a different operating system than the operating system that was previously on the client device 102. If not, the process 300 proceeds with installing the registry keys identified in the database 114 on the client device 102 (Block 325).

If a different operating system is being installed on the client device 102, the process 300 proceeds with Block 330 to determine which registry keys can be reinstalled on the client device 102. For instance, the management server 104 may identify which of the stored registry keys in the database 114 are compatible with the new operating system. In yet further embodiments, the management server 104 can utilize the translation module 118 to convert one or more registry keys compatible with the previous operating system into a format compatible with the new operating system.

At Block 330, the process 300 determines if there are any policies 116 that apply to the client device 102. For example, the management server 104 can determine if the client device 102 is part of a group for which one or more policies 116 dictates that certain registry keys are to be installed on devices within the group. For example, one of the policies 116 can indicate that a particular registry key 110 should be installed on all client devices within a particular group.

If one or more policies applies to the rebuilt system, the management module 112 modifies the registry 108 of the client device 102 according to the applicable policy(ies) (Block 335). Following Block 335, or if no policies 116 apply to the rebuilt device 102, the process 300 continues with Block 340 to reboot the client device 102.

In certain embodiments of the invention, the registry management systems and methods may be used in connection with a modular storage management system, embodiments of which are described in more detail in U.S. Pat. No. 7,035,880, issued Apr. 5, 2006, which is hereby incorporated herein by reference in its entirety. For example, one or more client devices and/or management servers may be part of a storage operation cell that includes combinations of hardware and software components directed to performing storage operations on electronic data. Exemplary storage operation cells usable with embodiments of the invention include CommCells as embodied in the QNET storage management system and the QINETIX storage management system by CommVault Systems, Inc. (Oceanport, N.J.), and as further described in U.S. Pat. No. 7,454,569, issued Nov. 18, 2008, which is hereby incorporated herein by reference in its entirety.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein.

Embodiments of the invention are also described above with reference to flow chart illustrations and/or block diagrams of methods, apparatus (systems) and computer program products. It will be understood that each block of the flow chart illustrations and/or block diagrams, and combinations of blocks in the flow chart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flow chart and/or block diagram block or blocks.

These computer program instructions may also be stored in a computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the acts specified in the flow chart and/or block diagram block or blocks.

In addition, methods and functions described herein are not limited to any particular sequence, and the acts or blocks relating thereto can be performed in other sequences that are appropriate. For example, described acts or blocks may be performed in an order other than that specifically disclosed, or multiple acts or blocks may be combined in a single act or block.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method for registry key management in a computer network, the method comprising:
   detecting registry keys stored in a registry of each of a plurality of client computing devices;
   storing on a remote database a copy of the registry keys of each of the plurality of client computing devices, the remote database being in network communication with each of the plurality of client computing devices;
   modifying the copy of the registry keys of a first one of the plurality of client computing devices on the remote database to reflect modifications to the registry of the first client computing device;
   detecting an upgrade or change of an operating system installed on the first client computing device;
   accessing a data structure in the remote database that indicates whether the first client computing device is a part of a group for which one or more particular ones of the registry keys are to be installed; and automatically reinstalling registry keys on the first client computing device based on the copy of the registry keys stored on the remote database and the information in the data structure.

2. The method of claim 1, further comprising tracking with a management module executing on the first client computing device modifications made to the registry of the first client computing device, wherein said tracking is performed with a user interface configured to receive registry changes input by a user.

3. The method of claim 1, wherein said detecting registry keys comprises identifying the registry keys based on predetermined criteria.

4. The method of claim 1, further comprising replicating according to one or more policies at least one registry key between at least two of the plurality of client computing devices.

5. The method of claim 1, wherein said upgrade or change comprises an installation of an operating system on the first client computing device.

6. The method of claim 5, wherein the operating system comprises a different operating system than a previous operating system installed on the first client computing device prior to said upgrade or change.

7. The method of claim 6, wherein said reinstalling registry keys comprises translating at least one registry key from a first format corresponding to the previous operating system to a second format corresponding to the different operating system.

8. The method of claim 1, wherein said detecting registry keys is performed with one or more application programming interfaces (APIs).

9. The method of claim 1, wherein said modifying the copy of the registry keys comprises adding a new registry key to the copy of the registry keys.

10. The method of claim 1, wherein said detecting an upgrade or change comprises detecting a failure of the client computing device.

11. The method of claim 1, wherein said storing the copy of the registry keys comprises storing fewer registry keys than those detected in the registries of the plurality of client computing devices.

12. The method of claim 1, wherein the operating system is a MICROSOFT WINDOWS operating system.

13. A system for managing registry keys in a computer network, the system comprising:
   a plurality of client computing devices each comprising a registry having a plurality of registry keys;
   at least one management server in network communication with the plurality of client computing devices, the at least one management server being configured to:
      detect registry keys stored in the registry of each of the plurality of client computing devices; and
      maintain in a database a copy of the registry keys installed in each registry of the plurality of client computing devices; and
   a management module executing on a first one of the plurality of client computing devices, the management module being configured to
      instruct the at least one management server to update the copy of the registry keys to reflect modifications made to the registry of the first client computing device,
   wherein the at least one management server is further configured to:
      modify the copy of the registry keys on the database to reflect said modifications to the registry of the first client computing device;
      detect an upgrade or change of an operating system installed on the first client computing device;
      access a data structure in the database that indicates whether the first client computing device is a part of a group for which one or more particular ones of the registry keys are to be installed; and
      automatically reinstall registry keys on the first client computing device based on the copy of the registry keys stored on the database and the information in the data structure.

14. The system of claim 13, wherein the copy of the registry keys comprises a full copy of the registry keys installed on the plurality of client computing devices.

15. The system of claim 13, wherein the copy of the registry keys comprises a list of the registry keys installed on the plurality of client computing devices.

16. The system of claim 13, wherein the management module is configured to reinstall the registry keys of the first client computing device to the first client computing device during a rebuilding of the first client computing device.

17. The system of claim 13, wherein the at least one management server further comprises a translation module configured to translate one of the registry keys associated with a first format corresponding to a first operating system to a second format corresponding to a second operating system.

18. The system of claim 13, wherein the at least one management server further accesses at least one predetermined policy to replicate at least one of the registry keys on one client computing device to a second client computing device.

19. The system of claim 13, wherein the management module comprises a user interface configured to receive registry key changes input by a user.

20. The system of claim 13, wherein the operating system is a MICROSOFT WINDOWS operating system.

* * * * *